No. 634,920.  
B. F. TAYLOR.  
PNEUMATIC TIRE.  
(Application filed Oct. 21, 1898.)  
Patented Oct. 17, 1899.

(No Model.)

WITNESSES:
Geo. W. Taylor.
E. Stevens

INVENTOR
Benjamin F. Taylor
BY
Chas. F. Dane
his ATTORNEY

UNITED STATES PATENT OFFICE.

BENJAMIN F. TAYLOR, OF BRIDGEPORT, CONNECTICUT, ASSIGNOR TO THE TAYLOR TIRE AND DEVELOPEMENT COMPANY, OF SAME PLACE.

PNEUMATIC TIRE.

SPECIFICATION forming part of Letters Patent No. 634,920, dated October 17, 1899.

Application filed October 21, 1898. Serial No. 694,206. (No model.)

*To all whom it may concern:*

Be it known that I, BENJAMIN F. TAYLOR, a citizen of the United States, and a resident of Bridgeport, Fairfield county, State of Connecticut, have invented new and useful Improvements in Pneumatic Tires, of which the following description, taken in connection with the drawings herewith accompanying, is a specification.

This invention relates to pneumatic or air-cushion tires and particularly to means for preventing the puncturing of the same. Heretofore tires of this character have been provided with a so-called "protective armor" composed of unwoven fibrous material adapted for rendering the tire puncture-proof. This material when packed into a dense mass is practically impenetrable, and therefore most effective for the purpose intended. It has been found in practice, however, that in the handling of the tires before being placed on wheels they are often subjected to sharp bends when being manipulated in securing the valve in position or when being placed into small packages for shipping, &c., which causes the fibrous material to draw apart and separate wherever such bend occurs, and when the tire is returned to its normal circular form, although the separated fibrous material is again brought together, it is not in that same condensed form it was prior to the separation and is liable to ready penetration at such point. It will thus be obvious that if a tire provided with such protective armor is handled to any considerable extent before being used the number of separations or breaks in the protective armor caused thereby will very materially reduce the efficiency of the armor. A further objection found to exist against such armor of fibrous material is that the material has a tendency to become separated and work into uneven masses, whereby the armor loses its required degree of density in spots and is so rendered ineffective.

Having in mind the above, it has been the object of my invention to render such fibrous armor more effective by preventing liability of breaks or undue separation in the same under the circumstances referred to.

To this end my invention consists in combining with the unwoven fibrous material a so-called "interlocking" web which passes through the same and so unites the fiber as to prevent any considerable separating of the same.

Figure 1:
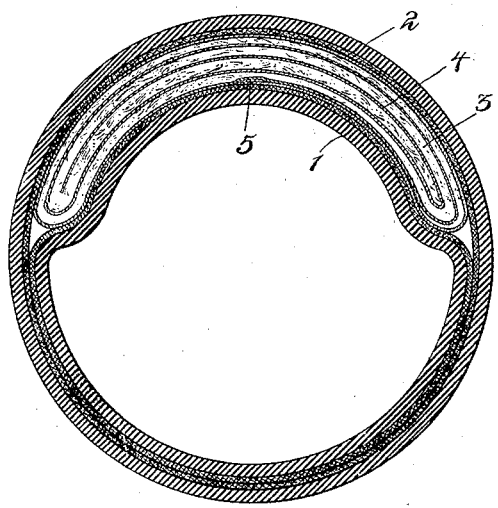
Figure 2:
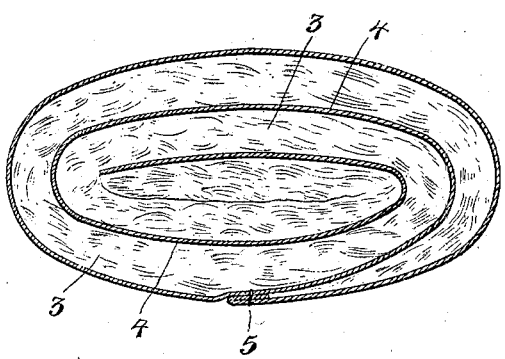
Figure 3:
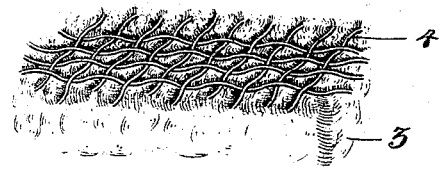

Referring to the accompanying drawings, which illustrate my invention, Figure 1 is a transverse sectional view, on an enlarged scale, of a tire embodying my invention, the protective armor being condensed or under pressure as when the tire is inflated. Fig. 2 is a transverse sectional view, on an enlarged scale, of my improved protective armor before being placed in the tire; and Fig. 3 is a perspective view, on an enlarged scale, showing a portion of the fibrous material and its interlocking web.

To explain in detail, the tire, as herein shown, is composed of an inner air-tube 1 and an outer casing 2, with my improved armor located between the same to protect said inner tube from puncture by a tack, nail, or any other sharp object which might penetrate the outer casing 2. Said protective armor, according to my invention, is composed of an unwoven fibrous material 3, having an interlocking web 4, of suitable material, running transversely and longitudinally throughout the same. The interlocking web 4 is preferably formed of a material having an open mesh in order that the adjacent fibrous material may readily embed itself in the same, as shown in Fig. 3, and be locked from undue movement relative thereto. In this manner it will be readily understood that the web 4 causes the fibrous material to retain its uniform thickness and density, and also in the event of the tire being subjected to any sharp bends the web prevents "breaking" or any considerable separating of the fibrous material at the point where such bend occurs. A further and important feature of the web 4 is that in serving the purposes above referred to it does not add materially to the cost of the protective armor nor interfere in any way with its flexibility.

The web 4 may be passed through the body of fibrous material 3 in any suitable manner, a simple and desirable way being to first lay the web out in a single layer, then place the fibrous material (preferably cotton) upon the web, and then roll or fold both the web and the fibrous material upon itself until an armor of the desired thickness is secured, after which the outer edge of the web is stitched or secured to the web itself, as at 5. In this way a uniformity is secured in the thickness of the fibrous material and in the arrangement of the interlocking web. When thus formed, the protective armor is inserted into the tire between the inner tube 1 and the outer casing 2, as shown in Fig. 1, although I wish it to be understood that my improved armor may be applied to any form of pneumatic tire and in any suitable manner.

Having thus set forth my invention, what I claim is—

A puncture-proof armor for pneumatic tires, composed of unwoven fibrous material having an interlocking web of open or loose meshed textile fabric winding around and through the same in a continuously-extending piece, for the purpose set forth.

BENJAMIN F. TAYLOR.

Witnesses:
CHAS. F. DANE,
E. STEVENS.